United States Patent
Angelmahr et al.

(10) Patent No.: US 11,989,346 B2
(45) Date of Patent: May 21, 2024

(54) FIBER-OPTIC SENSOR, DATA GLOVE AND METHOD FOR DETECTING CURVATURE

(71) Applicant: Fraunhofer-Gesellschaft zur Förderung der angewandten Forschung e.V., Munich (DE)

(72) Inventors: Martin Angelmahr, Goslar (DE); Wolfgang Schade, Goslar (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 264 days.

(21) Appl. No.: 17/209,091

(22) Filed: Mar. 22, 2021

(65) Prior Publication Data

US 2021/0208679 A1 Jul. 8, 2021

Related U.S. Application Data

(63) Continuation-in-part of application No. PCT/EP2018/075799, filed on Sep. 24, 2018.

(51) Int. Cl.
| | | |
|---|---|---|
| G02B 6/00 | (2006.01) | |
| G01B 11/16 | (2006.01) | |
| G01J 3/02 | (2006.01) | |
| G06F 3/01 | (2006.01) | |

(52) U.S. Cl.
CPC .............. G06F 3/014 (2013.01); G01B 11/18 (2013.01); G01J 3/0218 (2013.01)

(58) Field of Classification Search
None
See application file for complete search history.

(56) References Cited

U.S. PATENT DOCUMENTS

| | | | |
|---|---|---|---|
| 2004/0017985 A1* | 1/2004 | Cok | G02B 6/06 385/901 |
| 2007/0116415 A1 | 5/2007 | Kobayashi | |
| 2007/0297712 A1 | 12/2007 | Meneghini et al. | |
| 2013/0345719 A1* | 12/2013 | Donhowe | A61B 1/00167 385/13 |
| 2014/0036261 A1 | 2/2014 | Fujita et al. | |
| 2015/0355040 A1* | 12/2015 | Sirbuly | G01L 1/242 356/73.1 |
| 2016/0166130 A1 | 6/2016 | Fujita et al. | |
| 2018/0200000 A1 | 7/2018 | Takayama et al. | |

OTHER PUBLICATIONS

International Search Report dated Feb. 1, 2019, in PCT/EP2018/075799.
Written Opinion of the International Search Authority dated Feb. 1, 2019, in PCT/EP2018/075799.

* cited by examiner

*Primary Examiner* — Carl Adams
(74) *Attorney, Agent, or Firm* — Womble Bond Dickinson (US) LLP

(57) ABSTRACT

A fiber-optic sensor (1) is configured to detect curvature of an article (6). The sensor includes at least one light source (2), at least one optical fiber (4) and at least one receiver (3). The optical fiber (4) has at least one longitudinal portion (41, 42, 43) in which the refractive index for light at a predetermined wavelength is reduced with respect to the remaining longitudinal portions. A method for detecting curvature of an article such as a data glove (6) or an endoscope may utilize such a fiber-optic sensor.

27 Claims, 3 Drawing Sheets

FIBER-OPTIC SENSOR, DATA GLOVE AND METHOD FOR DETECTING CURVATURE

RELATED APPLICATIONS

The present application is a Bypass Continuation-in-Part of International Application No. PCT/EP2018/075799, filed Sep. 24, 2018 and published as WO 2020/064084A1. The contents of the aforementioned application are incorporated by reference in their entirety.

FIELD OF THE INVENTION

The invention relates to a fiber-optic sensor for detecting curvature of an article or an object. Said sensor comprises at least one light source, at least one optical fiber and at least one receiver. Furthermore, the invention relates to an article configured with such a sensor, for example a data glove or an endoscope. Finally, the invention relates to a method for detecting a curvature of an article, said method comprising the steps of coupling light from at least one light source into at least one optical fiber and evaluating transmitted light with at least one receiver.

BACKGROUND

A fiber-optic sensor of the type mentioned is known from US 2007/0297712 A1. This sensor consists of an optical fiber which has a cladding and a plurality of cores. Light is coupled into the cores of the optical fiber and propagates along the optical fiber by total reflection at the interfaces between core and cladding. The cores contain Bragg gratings which reflect a portion of the light. The wavelength of this reflected portion depends from the respective grating constant. When the optical fiber is bent, these Bragg gratings are stretched or compressed so that their grating constant changes. The curvature of the optical fiber can thus be determined by determining the wavelength of reflected light from the respective core.

However, this known device has the disadvantage that complex spectrometers are required to evaluate the wavelength of reflected light. These spectrometers enlarge the installation space required for the readout device and reduce the operational reliability.

Thus, it is an object of the present invention to determine the curvature of an article easily and more reliably.

SUMMARY OF THE INVENTION

In one embodiment of the invention, the object is solved by a fiber-optic sensor for detecting a curvature of an article, having at least one light source, at least one optical fiber and at least one receiver, wherein the optical fiber has at least one coated longitudinal portion, said coated longitudinal portion having at least a partial coating of an outer surface of the optical fiber, said partial coating reducing in the coated longitudinal portion of the optical fiber a refractive index for light of a specific wavelength.

In another embodiment of the invention, the object is solved by a data glove having a fiber-optic sensor, said fiber-optic sensor having at least one light source, at least one optical fiber and at least one receiver, wherein the optical fiber has at least one coated longitudinal portion, said coated longitudinal portion having at least a partial coating of an outer surface of the optical fiber, said partial coating reducing in the coated longitudinal portion of the optical fiber a refractive index for light of a specific wavelength.

In still another embodiment of the invention, the object is solved by an endoscope having a fiber-optic sensor, said fiber-optic sensor having at least one light source, at least one optical fiber and at least one receiver, wherein the optical fiber has at least one coated longitudinal portion, said coated longitudinal portion having at least a partial coating of an outer surface of the optical fiber, said partial coating reducing in the coated longitudinal portion of the optical fiber a refractive index for light of a specific wavelength.

In still another embodiment of the invention, the object is solved by a method for detecting a curvature of an article, comprising the following steps: Coupling light from at least one light source into at least one optical fiber running along the length of said article, allowing total reflection of said light inside of said optical fiber, thereby bringing the light in contact with at least one coated longitudinal portion of said optical fiber, said coated longitudinal portion having at least a partial coating of an outer surface of the optical fiber such that a portion of said light having a specific wavelength and depending on curvature is allowed to escape from the optical fiber, and wherein an intensity of the light of this specific wavelength is detected by means of at least one receiver.

According to the invention, a fiber-optic sensor for detecting the curvature of an article is disclosed. The fiber-optic sensor has at least one light source which emits electromagnetic radiation of a predetermined wavelength. In some embodiments of the invention, the light source can be a light-emitting diode, a superluminescent diode, or a semiconductor laser or contain such an element. In other embodiments of the invention, the light source can be a display having a plurality of pixels which emit light of a predetermined wavelength or a predetermined wavelength distribution.

In some embodiments of the invention, the light source can be monochromatic, i.e. the light source emits light of a single wavelength or a narrow wavelength distribution. In other embodiments of the invention, the light source can generate broadband radiation having, for example, a wavelength distribution with a full width at half maximum or half-value width between about 50 nm and about 150 nm. In yet other embodiments of the invention, the light source can generate multiple discrete wavelengths.

The light source can emit electromagnetic radiation of the visible spectral range. In other embodiments of the invention, the light source can generate infrared radiation. In yet other embodiments of the invention, the light source can generate ultraviolet radiation. In some embodiments of the invention, the light source can also generate infrared and visible or visible and ultraviolet radiation, in particular when the light source is configured and intended to generate a plurality of discrete, spectrally distinct wavelengths.

According to the invention, it is proposed to couple the light emitted from the light source into at least one optical fiber. In some embodiments, the optical fiber can have a core and a cladding surrounding the core. Here, the core on the one hand and the cladding on the other hand have different refractive indices, so that light coupled into the core is totally reflected at the interface between core and cladding.

In other embodiments of the invention, the optical fiber can have only a core without a surrounding cladding. In this case, the total reflection occurs at the interface between the core and the atmosphere surrounding the core.

The light propagating in the optical fiber is supplied to at least one receiver. The receiver is configured to detect the intensity of incoming light. In some embodiments of the invention, a plurality of receivers can be present, each of which detects the intensity of a predetermined wavelength and/or wavelength range. In some embodiments of the invention, the receiver can be, for this purpose, a photodiode, a photoresistor or a phototransistor or contain such an element. In other embodiments of the invention, the receiver can be a photodiode array having a plurality of photodiodes which can be read out individually.

In some embodiments of the invention, the receiver can be an image sensor, which is designed either as a line sensor or as a two-dimensional area sensor. An image sensor of this type can have a plurality of pixels, each of which is designed to detect the intensity of incident radiation. In some embodiments of the invention, the pixels themselves can be divided into subpixels which detect the intensity of incident radiation in predetermined wavelength ranges that differ from one another. For this purpose, the receiver can have one or more filter elements that transmit light of a predetermined wavelength and/or a predetermined wavelength range and absorb other radiation.

According to the invention, it is now proposed that the optical fiber have at least one longitudinal portion in which the refractive index for light of a predetermined wavelength is reduced with respect to the remaining longitudinal portions. This feature has the effect that, in the case of curvature of at least the longitudinal portion of the optical fiber, the total reflection is reduced in a wavelength-selective manner. In the longitudinal portion, the light of the predetermined wavelength thus experiences an increased coupling-out in the event of curvature of the optical fiber in this longitudinal portion. The intensity of the light of the predetermined wavelength therefore decreases with increasing curvature of the optical fiber. However, light of a different wavelength can still propagate almost without loss by total reflection at the interface. In contrast to known fiber optic sensors, it is thus not necessary to detect the wavelength of the reflected light in order to determine the curvature. It is rather sufficient to determine only the intensity of transmitted light. However, the determination of the intensity is possible in a much simpler and more reliable manner than the determination of the wavelength, so that the fiber-optic sensor according to the invention requires less equipment. This reduces the required installation space and increases the operational reliability.

In some embodiments of the invention, the optical fiber can have a smaller diameter in the at least one longitudinal portion. This can further reduce the degree of total reflection, thereby increasing the signal-to-noise ratio and making the measurement of curvature more accurate.

In some embodiments of the invention, the reduction of the refractive index can be achieved by partial coating of an outer surface of the optical fiber. The partial coating is applied at least to the outer surface of the curvature of the longitudinal portion in which the refractive index for light of a predetermined wavelength is reduced. By choosing the coating material and the location and size of the coated partial area, it is easy to select the locations of the optical fiber, the curvature of which shall be determined or monitored.

In some embodiments of the invention, the partial coating can contain or consist of nanoparticles. These nanoparticles can be applied to the outer side of the optical fiber by vapor deposition or by bonding agents. By choosing the material and the diameter of the nanoparticles it is possible to select the predetermined wavelength for which the refractive index shall be reduced at predetermined locations of the optical fiber.

In some embodiments of the invention, the partial coating can contain or consist of nanoparticles which contain or consist of gold. Such nanoparticles can be easily produced, and by varying their size, the desired predetermined wavelength can be determined extensively.

In some embodiments of the invention, the partial coating can contain or consist of nanoparticles that have a diameter from about 1 nm to about 300 nm, or from about 50 nm to about 200 nm, or from about 125 nm to about 175 nm.

In some embodiments of the invention, the optical fiber can be a multimode fiber. This facilitates the realization of a plurality of measurement locations along the longitudinal extension of the optical fiber, wherein individual measurement locations of the curvature can be distinguished on the basis of the wavelength. In other embodiments of the invention, the optical fiber can be a single-mode fiber.

In some embodiments of the invention, the optical fiber can be a polymer fiber. Compared to a glass fiber, such a polymer fiber has the advantage that it has greater absolute stretchability. In some embodiments of the invention, the stretchability can be greater than about 5% or greater than about 10% or greater than about 15%. This can be used to realize a wider measurement range than can be achieved with other waveguides, e.g. glass fibers.

In some embodiments of the invention, the optical fiber can have a bifurcation. This allows the receiver and the light source to be arranged at the same end of the optical fiber, so that the entire signal generation and processing can be set up in a space-saving manner, for example together with the evaluation and control electronics on a single circuit carrier.

In some embodiments of the invention, the bifurcation can be designed in the form of a fusion coupler, a fiber coupler, or a 3 dB coupler.

In some embodiments of the invention, one end of the optical fiber can be mirrored. This allows light to be reflected back from one end of the fiber to the other end of the fiber, so that the transmitter and receiver can be located at one end of the fiber. In addition, the light propagates multiple times through the optical fiber so that a larger portion is coupled out at the curved partial surfaces and the signal-to-noise ratio is further increased.

In some embodiments of the invention, the fiber optic sensor according to the invention can be used in a data glove or an endoscope. When used in a data glove, the optical fiber used according to the invention can be attached to a woven or knitted fabric of a textile glove by weaving, bonding, or welding. In order to detect the movement of three joints per finger, three measuring points are realized in each optical fiber in this embodiment of the invention, each of which is realized by different partial coating of the outer side of the optical fiber. The respective partial coating causes a reduction of the refractive index for light of a respectively predetermined wavelength, a different wavelength being selected for each joint. In this way, the curvatures of the individual finger joints can be distinguished in the wavelength multiplex and detected separately.

BRIEF DESCRIPTION OF THE DRAWINGS

The invention shall be explained in more detail below with reference to the attached drawings without limiting the general concept of the invention, wherein.

DETAILED DESCRIPTION

Figure 1:
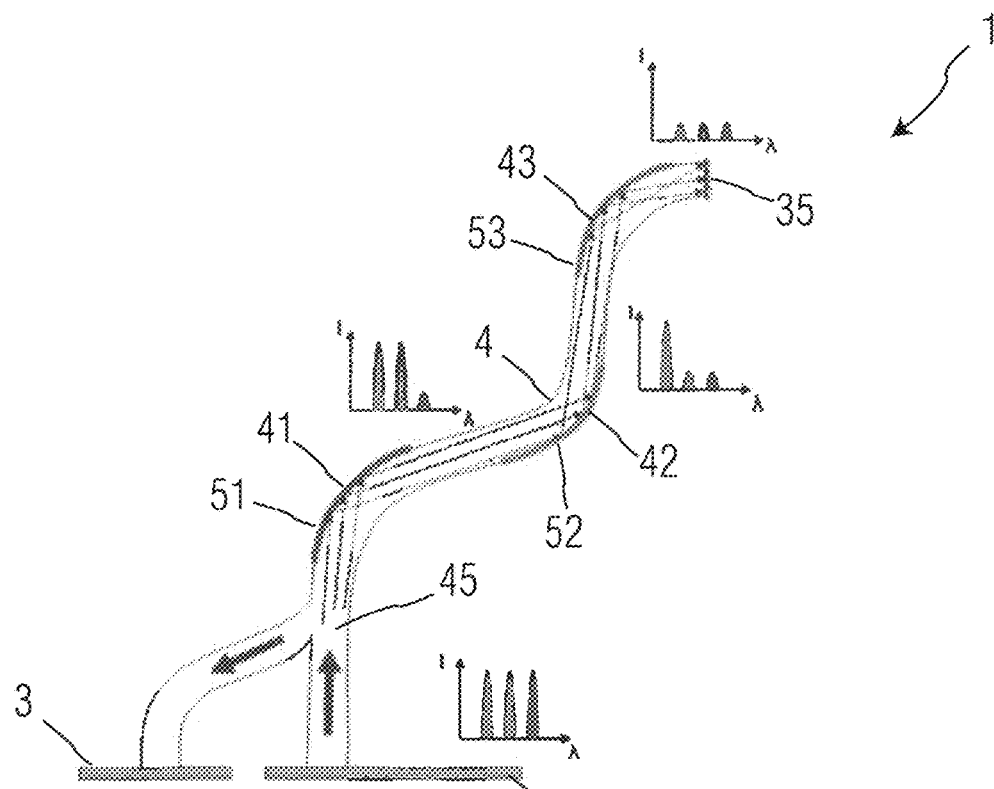
FIG. 1 shows a fiber-optic sensor according to a first embodiment of the invention.

FIG. 1 illustrates a first embodiment of a fiber-optic sensor according to the invention. The fiber-optic sensor 1 has at least one light source 2, an optical fiber 4 and a receiver 3. At least one longitudinal portion 41, 42, 43 of the optical fiber 4 is provided with a partial coating 51, 52, 53, which reduces the refractive index for light of a predetermined wavelength with respect to the remaining longitudinal portions of the optical fiber 4. In the illustrated exemplary embodiment, three longitudinal portions 41, 42 and 43 are shown, which are each provided with a different partial coating 51, 52 and 53, which reduces the refractive index for light of different wavelengths in each case and leaves light of other wavelengths essentially unaffected. Thus, while a given partial coating reduces the refractive index for light of a specific wavelength, it is configured not to reduce the refractive index of light for wavelengths away from the specific wavelength.

In order to explain the function of the invention, the three predetermined wavelengths are designated by the verbal designations "red", "green" and "blue". However, this does not mean that in all embodiments of the invention the predetermined wavelengths must necessarily be selected from the visible spectral range. It is also conceivable that in other embodiments of the invention, three wavelengths and/or wavelength ranges are selected from the infrared spectral range or the ultraviolet spectral range. In some embodiments of the invention, the predetermined wavelengths can also be partially visible and partially infrared or ultraviolet. The following description is to be understood as merely explanatory, not as limiting. Of course, the invention does not teach the use of exactly three predetermined wavelengths as a solution principle. In other embodiments of the invention, the number of wavelengths and thus the number of measurement locations for detecting the curvature can also be larger or smaller and can be between 1 and about 10.

During the operation of the fiber-optic sensor according to the invention, the light source 2 generates light that has at least one predetermined wavelength. In some embodiments of the invention, the light source 2 can emit a broad spectral distribution that has all of the used predetermined wavelengths for all measurement locations along the optical fiber. In other embodiments of the invention, the light source 2 can emit discrete wavelengths. As shown in the spectrum in FIG. 1, the light source 2 emits, in the embodiment shown, three wavelengths and/or comparatively narrow wavelength ranges which correspond to the predetermined wavelengths red, green and blue. For this purpose, the intensity on the ordinate is plotted against the wavelength λ, on the abscissa in FIG. 1.

The light from the light source 2 is coupled into the at least one optical fiber 4. The light passes the bifurcation 45, which can be formed for example by a fusion coupler, a fiber coupler or a 3 dB coupler, and impinges on the first longitudinal portion 41, which is provided with a first partial coating 51, as a result of which the refractive index for a light of a first wavelength (e.g., red light) is reduced with respect to the remaining longitudinal portions. Alternatively, or additionally, the fiber 4 can have a smaller diameter in the first longitudinal portion 41.

Provided that the optical fiber 4 is straight, the light of the first wavelength (e.g., red light) is nevertheless guided by total reflection in the optical fiber 4. However, if the optical fiber 4 is curved in the first longitudinal portion 41 as shown, the light of the first wavelength (e.g., red light) can be coupled out of the optical fiber depending on the amount of curvature. As shown in the spectrum illustrated adjacent to the first longitudinal portion 41, this reduces the intensity of the light of the first wavelength (e.g., red light), whereas lights of other wavelengths (e.g., green and blue light) continue to propagate along the optical fiber 4.

In the same way, the second longitudinal portion 42 is provided with a second partial coating 52 that reduces the refractive index for light of a second wavelength (e.g., green light) while allowing lights of other wavelengths (e.g., red or blue light) to propagate essentially unchanged. Thus, in the second longitudinal portion 42, the intensity of the light of the second wavelength (e.g., green light) is reduced on the basis of the curvature.

Finally, in the third longitudinal portion 43, a third partial coating 52 is applied which reduces the refractive index for light of a third wavelength (e.g., blue light) and leaves lights of other wavelengths (e.g., red and green light) essentially unaffected. Thus, in the third longitudinal portion 43, light of the third wavelength (e.g., blue light) can be coupled out of the optical fiber 4 depending on the curvature, so that its intensity weakens on the basis of the curvature.

At the end of the optical fiber 4 opposite the light source 2 there is a mirror coating 35, for example in the form of a metallization. Incident light is reflected there and then reflected back again by total reflection in the optical fiber 4 in the original coupling-in direction.

At the bifurcation 45, at least part of the reflected, propagating light is coupled out and directed to the receiver 3. The receiver 3 is configured to determine the intensity of the incoming light separately for the three wavelengths (e.g., red, green and blue). Color filters can be used for this purpose, for example. In some embodiments of the invention, the receiver 3 can be an image sensor known per se, which is designed, for example, as a line or area CCD sensor or as a CMOS sensor. This sensor has a plurality of pixels, each of which contains subpixels that are sensitive to a specific wavelength.

After calibration, the curvature in the first, second and third longitudinal portions 41, 42 and 43 of the optical fiber 4 can be determined in an absolute way from the respective measured intensity of the various light wavelengths and/or wavelength ranges (e.g., red, green and blue). If the optical fiber 4 runs along a flexible object, for example a finger, an endoscope or a cable, the curvature of this object can be determined from the measured intensity without the need for a complex spectrometer.

Figure 2:
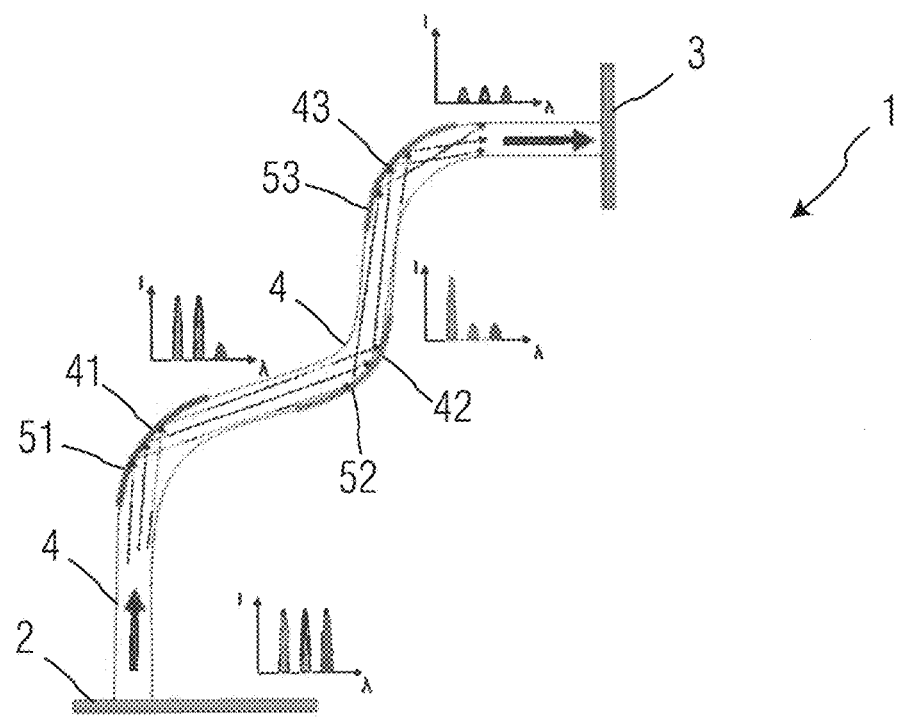
FIG. 2 shows a fiber-optic sensor according to a second embodiment of the invention.

With reference to FIG. 2, a second embodiment of the invention is explained in more detail. Identical components of the invention are marked with the same reference sign, so that the following description is limited to the essential differences.

As is shown from FIG. 2, the light source 2 and the receiver 3 are arranged at different ends of the optical fiber 4. The bifurcation 45 can be omitted in this embodiment of the invention. Light of a predetermined or known wavelength distribution is coupled in by the light source 2 at the first end of the optical fiber 4. Depending on the curvature in the first, second and third longitudinal portions 41, 42 and 43, individual wavelengths and/or wavelength ranges are attenuated and the resulting intensity distribution is detected in the receiver 3. The light from the light source 2 thus reaches the receiver 3 after a single pass through the optical fiber 4.

Figure 3:
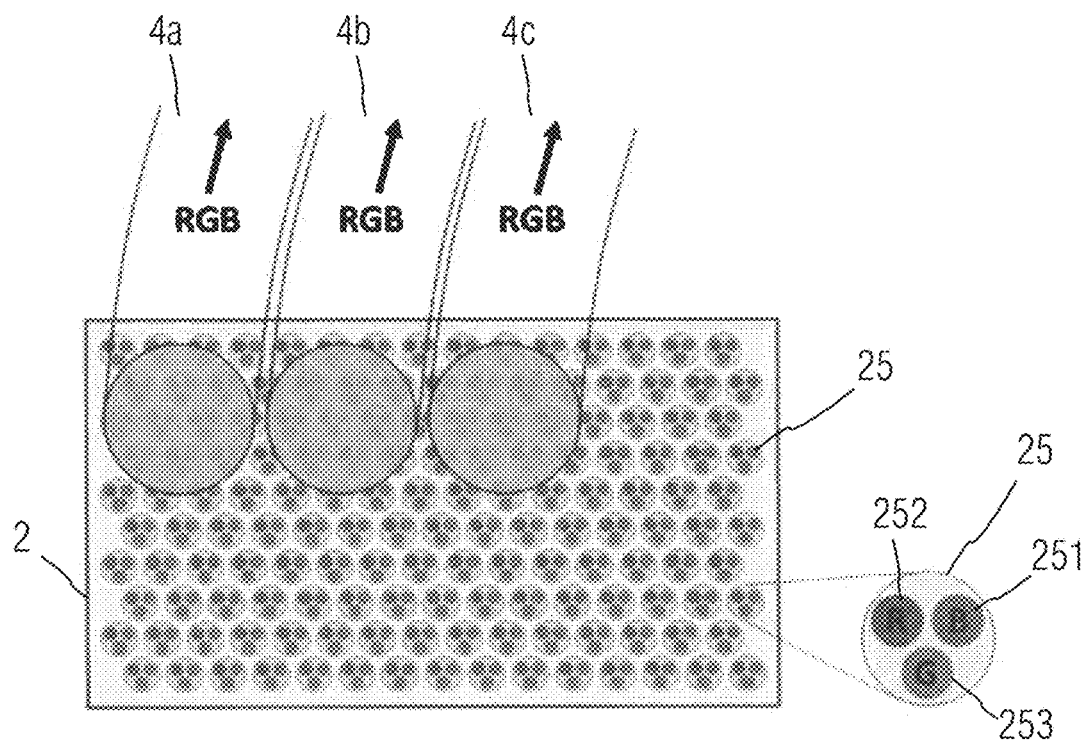
FIG. 3 shows the coupling of an optical fiber to a light source.

FIG. 3 again shows the coupling of the optical fiber 4 to the light source 2. A plurality of optical fibers 4 can be used to monitor the curvature of a plurality of articles. FIG. 3 shows three optical fibers 4a, 4b and 4c as examples.

In the illustrated exemplary embodiment, the light source 2 contains a display chip known per se, which is used, for example, as a display element in cell phones, small computers, automobiles or other electronic devices. The light source or the display chip 2 contains a plurality of pixels 25. Each pixel 25 contains three subpixels 251, 252 and 253, each of which emits light of a predetermined wavelength. In the illustrated exemplary embodiment, the first subpixel 251 emits blue light, the second subpixel 252 emits red light, and the third subpixel 253 emits green light. In this way, the pixel 25 can emit white light, or with appropriate adjustment of the intensity of the subpixels, light of a mixed color.

In the illustrated exemplary embodiment, the individual pixels 25 have such a small size that the light from a plurality of pixels 25 is coupled into a single optical fiber 4. This increases the intensity of the light so that a reliable readout of the curvature is possible.

In the same way as shown in FIG. 3 for the light source 2, the coupling of a receiver 3 can also be carried out if the receiver 3 contains an image sensor known per se, for example a CCD sensor, a CMOS sensor or another light-sensitive element which has a plurality of pixels that can detect a wavelength-resolved intensity by subdivision into subpixels.

Figure 4:
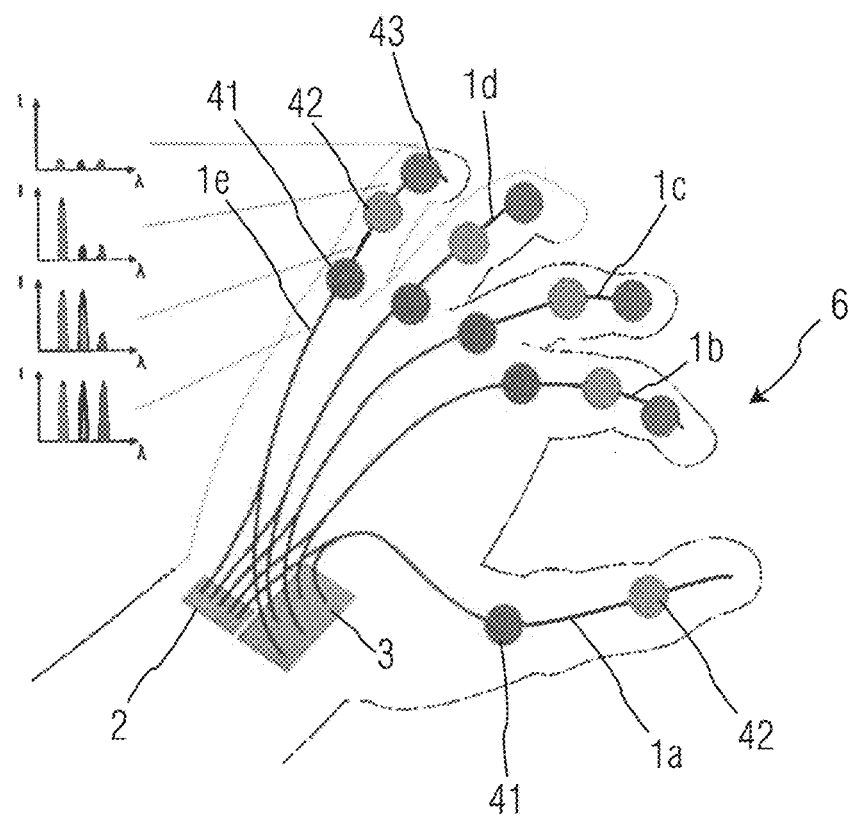
FIG. 4 shows a data glove equipped with the sensor according to the invention.

Referring to FIG. 4, the application of the invention is explained on the basis of a data glove 6. The data glove 6 is an input device in the form of a glove having a glove body with five sleeve-like digits (four fingers and a thumb). It is worn by a user and digitizes the movement of the fingers. The movement of the hand or individual fingers can then be used to control a computer program.

For this purpose, the data glove 6 has a finger glove made of a woven or knitted fabric that is known per se. Fiber optic sensors 1a, 1b, 1c, 1d and 1e are incorporated into the material of the glove 6. This can be done by weaving, welding or bonding the optical fibers. Preferably, the optical fibers of the fiber-optic sensors 1a, 1b, 1c, 1d and 1e contain polymer fibers, which have a comparatively large stretchability and thus are not overstretched and thereby damaged when finger joints are angled.

The four optical fibers 1b, 1c, 1d and 1e each have three longitudinal portions 41, 42 and 43 at which the curvature is determined. For this purpose, a partial coating is applied to the respective longitudinal portions 41, 42 and 43, which reduces the refractive index for light of a given wavelength, as already shown in detail in FIG. 1. The respective longitudinal portions 41, 42 and 43 are arranged within the optical fibers in such a way that they come to rest approximately at the finger joints. Thus, the curvature of the respective finger joints can be detected.

Due to the anatomy of the human hand, the fiber optic sensor 1a, which detects the curvature of the thumb, contains only two longitudinal portions 41 and 42. The detection of the curvature of a third longitudinal portion can be omitted in this case.

FIG. 4 also shows how a light source 2 and a receiver 3 are integrated into the glove. Thus, the diffraction of the respective finger can be discriminated via the optical fiber used in each case, the individual joints of the finger being detected in the wavelength multiplex. The movement of different fingers can be discriminated by the spatial separation of the pixels of the receiver. Thus, the invention allows in a simple way the digitization of the hand movement without the use of mechanical components and without the use of a complex spectrometer, which is necessary for known fiber-optic curvature sensors.

It can therefore be seen that the data glove 6 comprises a glove body having five digits, including four fingers and a thumb. The data glove 6 also includes a fiber optic sensor assembly comprising a plurality (in this instance, five) optical fibers 4. Four of the optical fibers extend into the fingers and have three coated longitudinal portions 41, 42, 43. One optical fiber extends into the thumb and has two coated longitudinal portions 41, 42. Each coated longitudinal portion has at least a partial coating on an outer surface of the optical fiber, said partial coating reducing a refractive index for light of a specific wavelength, in a corresponding coated longitudinal portion. Also, in this fiber optic sensor assembly, the optical fibers share a common light source, such as the aforementioned display chip containing a plurality of pixels, and also share a common receiver.

Figure 5:
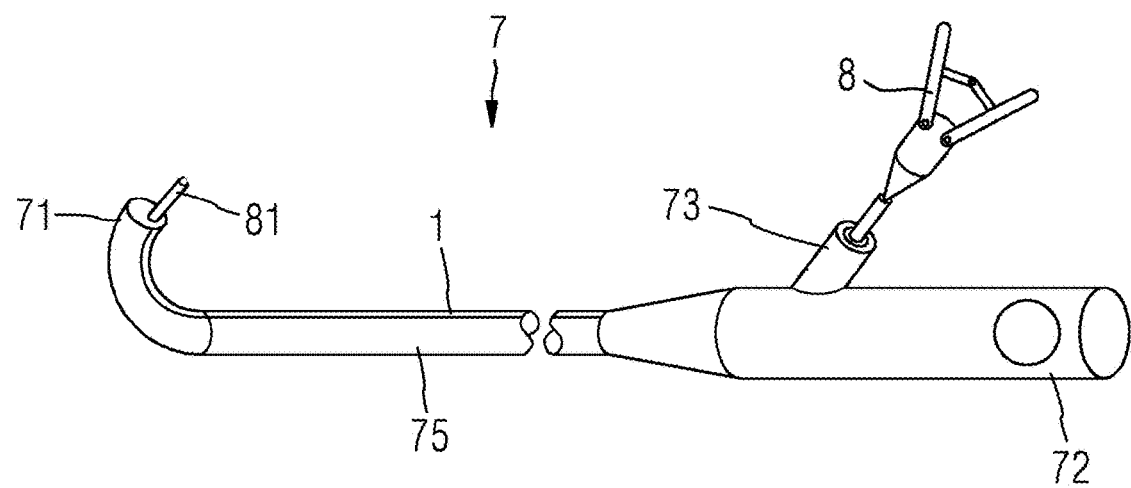
FIG. 5 shows an endoscope equipped with the sensor according to the invention.

FIG. 5 shows an endoscope 7 having a fiber optic sensor 1 of the sort described above. The endoscope comprises a flexible shaft 75 with a first end 71 and a second end 72. The endoscope features an optional port 73 configured to receive a tool 8 having a tool tip 81. The fiber optic sensor runs along the length of the shaft 75 and is configured to measure a bending of the shaft 75. While the fiber optic sensor 1 is seen in the figure to be on the surface of the endoscope, in other embodiments it may be internal to the structure of the endoscope. Also, in some embodiments, the fiber optic sensor 1 may have only a single coated longitudinal portion, preferably proximate the first end 71. In other embodiments, multiple such coated longitudinal portions may be provided, each portion corresponding to a different wavelength.

It is noted that, the invention is not limited to the illustrated embodiments. The above description should not be regarded as restrictive but as explanatory. The following claims are to be understood in such a way that a cited feature is present in at least one embodiment of the invention. This does not exclude the presence of further features. Insofar as the claims and the 25 above description define "first" and "second" embodiments, this designation serves to distinguish between two similar embodiments without determining an order.

What is claimed is:

1. A fiber-optic sensor for detecting a curvature of an article, having
    at least one light source,
    at least one optical fiber and
    at least one receiver, wherein
    the optical fiber has at least one coated longitudinal portion, said coated longitudinal portion having at least a partial coating on an outer surface of the optical fiber, said partial coating reducing a refractive index for light of a specific wavelength, in said coated longitudinal portion.

2. Fiber-optic sensor according to claim 1, wherein the partial coating comprises nanoparticles.

3. Fiber-optic sensor according to claim 2, wherein the partial coating comprises nanoparticles comprising gold.

4. Fiber-optic sensor according to claim 2, wherein the partial coating comprises nanoparticles having a diameter from 1 nm to 300 nm.

5. Fiber-optic sensor according to claim 2, wherein the partial coating comprises nanoparticles having a diameter from 50 nm to about 200 nm.

6. Fiber-optic sensor according to claim 1, wherein the optical fiber is a multimode fiber.

7. Fiber-optic sensor according to claim 1, wherein the optical fiber is a polymer fiber.

8. Fiber-optic sensor according to claim 1, wherein the light source comprises a color display having a plurality of pixels.

9. Fiber-optic sensor according to claim 1, wherein the receiver comprises an image sensor having a plurality of pixels, each of said pixels comprising subpixels, each subpixel being sensitive to a specific wavelength.

10. Fiber-optic sensor according to claim 1, wherein the optical fiber has a plurality of coated longitudinal portions along its length, each coated longitudinal portion having a different coating, each coating configured to reduce a refractive index for light of a different wavelength.

11. Fiber-optic sensor according to claim 10, wherein:
each coating comprises nanoparticles; and
the respective coatings applied to two different coated longitudinal portions differ from one another in one or more of the number of nanoparticles, the size of nanoparticles, and the material of the nanoparticles.

12. Fiber-optic sensor according to claim 1, wherein one end of the optical fiber is reflective.

13. A data glove or endoscope comprising a fiber-optic sensor in accordance with claim 1.

14. The data glove or endoscope according to claim 13, wherein the partial coating comprises nanoparticles.

15. The data glove or endoscope according to claim 14, wherein the partial coating comprises nanoparticles comprising gold.

16. The data glove or endoscope according to claim 14, wherein the partial coating comprises nanoparticles having a diameter from 1 nm to 300 nm.

17. The data glove or endoscope according to claim 13, wherein the optical fiber is a multimode fiber.

18. The data glove or endoscope according to claim 13, wherein the optical fiber is a polymer fiber.

19. The data glove or endoscope according to claim 13, wherein the light source comprises a color display having a plurality of pixels.

20. The data glove or endoscope according to claim 13, wherein the receiver comprises an image sensor having a plurality of pixels, each of said pixels comprising subpixels, each subpixel being sensitive to a specific wavelength.

21. The data glove or endoscope according to claim 13, wherein one end of the optical fiber is reflective.

22. The data glove or endoscope according to claim 13, wherein the optical fiber has a plurality of coated longitudinal portions along its length, each coated longitudinal portion having a different coating, each coating configured to reduce a refractive index for light of a different wavelength.

23. The data glove or endoscope according to claim 22, wherein:
each coating comprises nanoparticles and
the respective coatings applied to two different coated longitudinal portions differ from one another in one or more of the number of nanoparticles, the size of nanoparticles, and the material of the nanoparticles.

24. A method for detecting a curvature of an article, comprising:
providing at least one optical sensor in accordance with claim 1;
coupling light of a specific wavelength from at least one light source into said at least one optical fiber;
allowing total reflection of said light inside of said optical fiber, thereby bringing the light in contact with said at least one coated longitudinal portion such that a first portion of said light of a specific wavelength escapes from the optical fiber, said first portion depending on a curvature of the optical fiber at said coated longitudinal portion, and
detecting, with said receiver, an intensity of the light of this specific wavelength after the light has traveled through the optical fiber, the detected intensity being reflective of the curvature of the article.

25. The method according to claim 24, wherein
the light source emits light of different wavelengths and wherein
the optical fiber has different coated longitudinal portions along its length, each coated longitudinal portion having a different coating, such that the curvature is detected at different coated longitudinal portions along the length of the optical fiber by means of a wavelength multiplex.

26. Fiber-optic sensor according to claim 1, wherein said partial coating is configured not to reduce a refractive index for light of wavelengths away from the specific wavelength.

27. A data glove comprising:
a glove body having five digits including four fingers and a thumb;
a set of five optical fibers including four optical fibers extending into the fingers and having three coated longitudinal portions and one optical fiber extending into the thumb and having two coated longitudinal portions, each coated longitudinal portion having at least a partial coating on an outer surface of the optical fiber, said partial coating reducing a refractive index for light of a specific wavelength, in a corresponding coated longitudinal portion;
a common light source configured to provided light to all the optical fibers; and
a common light receiver configured to receive light from all the optical fibers.

* * * * *